United States Patent
Zhang

(10) Patent No.: US 10,690,833 B2
(45) Date of Patent: Jun. 23, 2020

(54) LIGHT GUIDE PLATE ASSEMBLY, BACKLIGHT SOURCE AND DISPLAY DEVICE

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventor: Qi Zhang, Beijing (CN)

(73) Assignees: BOE TECHNOLOGY GROUP CO., LTD., Beijing (CN); BOE OPTICAL SCIENCE AND TECHNOLOGY CO., LTD., Suzhou, Jiangsu (CN)

( * ) Notice: Subject to any disclaimer, the term of this patent is extended or adjusted under 35 U.S.C. 154(b) by 0 days.

(21) Appl. No.: 16/116,035

(22) Filed: Aug. 29, 2018

(65) Prior Publication Data

US 2019/0204499 A1  Jul. 4, 2019

(30) Foreign Application Priority Data

Jan. 3, 2018 (CN) .......................... 2018 1 0006078

(51) Int. Cl.
*F21V 8/00* (2006.01)
(52) U.S. Cl.
CPC .......... *G02B 6/0053* (2013.01); *G02B 6/002* (2013.01); *G02B 6/0016* (2013.01); *G02B 6/0031* (2013.01); *G02B 6/0043* (2013.01); *G02B 6/0058* (2013.01); *G02B 6/0076* (2013.01)
(58) Field of Classification Search
CPC ... G02B 6/0053; G02B 6/0016; G02B 6/0031
See application file for complete search history.

(56) References Cited

U.S. PATENT DOCUMENTS

| 5,598,280 A * | 1/1997 | Nishio | F21V 5/04 |
| | | | 349/57 |
| 9,541,701 B2 * | 1/2017 | Thompson | G02B 6/005 |
| 9,684,338 B1 * | 6/2017 | Menon | G06F 1/1643 |
| 2004/0130884 A1 * | 7/2004 | Yoo | G02B 6/0028 |
| | | | 362/613 |

(Continued)

FOREIGN PATENT DOCUMENTS

| CN | 101852364 A | 10/2010 |
| CN | 101900301 A | 12/2010 |

(Continued)

OTHER PUBLICATIONS

First Chinese Office Action dated Sep. 3, 2019, received for corresponding Chinese Application No. 201810006078.2, 14 pages.

*Primary Examiner* — Mary Ellen Bowman
(74) *Attorney, Agent, or Firm* — Kinney & Lange, P.A.

(57) ABSTRACT

The present disclosure provides a light guide plate assembly, a backlight source and a display device. The light guide plate assembly includes at least two light guide plates that are stacked on each other. Refractive indexes of the light guide plates are monotonously changed in a stacking direction of the light guide plates. One side of each light guide plate is provided with a refraction cavity. The refraction cavities of adjacent two light guide plates are disposed in two sides of the light guide plate assembly in a staggered manner. A light scattering layer is disposed at an inner wall that encloses the refraction cavity of each light guide plate.

17 Claims, 3 Drawing Sheets

(56) References Cited

U.S. PATENT DOCUMENTS

| | | | | |
|---|---|---|---|---|
| 2007/0124122 A1* | 5/2007 | Freier | ................... | G06T 15/506 |
| | | | | 703/2 |
| 2009/0257245 A1* | 10/2009 | Kim | ................... | G02B 6/0061 |
| | | | | 362/626 |
| 2010/0139165 A1* | 6/2010 | Oyama | ................... | A01G 7/045 |
| | | | | 47/1.01 R |
| 2010/0253882 A1* | 10/2010 | Han | ................... | G02B 6/005 |
| | | | | 349/65 |
| 2011/0013421 A1 | 1/2011 | Urn | | |
| 2012/0120680 A1 | 5/2012 | Fang et al. | | |
| 2018/0307100 A1* | 10/2018 | Xu | ................... | G02F 1/133603 |
| 2018/0356583 A1 | 12/2018 | Li et al. | | |

FOREIGN PATENT DOCUMENTS

| | | |
|---|---|---|
| CN | 202057827 U | 11/2011 |
| CN | 202141827 U | 2/2012 |
| CN | 102692669 A | 9/2012 |
| CN | 102692670 A | 9/2012 |
| CN | 203759289 U | 8/2014 |
| CN | 104765097 A | 7/2015 |
| CN | 107102397 A | 8/2017 |
| WO | 20101190497 A1 | 9/2010 |

\* cited by examiner

LIGHT GUIDE PLATE ASSEMBLY, BACKLIGHT SOURCE AND DISPLAY DEVICE

CROSS-REFERENCE TO RELATED APPLICATION

This application is based on, and claims priority to, Chinese Patent Application No. 201810006078.2, filed on Jan. 3, 2018, which is incorporated herein by reference in its entirety.

TECHNICAL FIELD

The present disclosure relates to the field of display technology, and in particular to a light guide plate assembly, a backlight source, and a display device.

BACKGROUND

One way for improving an image contrast of a display device is usually to optimize the contrast of the display device through DFC digitalization. This is implemented by fine-tuning transmittance of a display panel and does not directly affect distribution of backlight brightness, and thus has no obvious effect on the improvement of the contrast of the display device. Meanwhile, the above way cannot reduce power consumption. Further, when a light source of the display device is turned on or off, light mixing phenomena may occur at some portion of a backlight source of the display device, thereby affecting the display effect of the display device.

SUMMARY

According to a first aspect, one embodiment of the present disclosure provides a light guide plate assembly. The light guide plate assembly includes at least two light guide plates that are stacked on each other. Refractive indexes of the light guide plates are monotonously changed in a stacking direction of the light guide plates. One side of each light guide plate is provided with a refraction cavity; the refraction cavities of adjacent two light guide plates are disposed at two sides of the light guide plate assembly in a staggered manner. A light scattering layer is disposed at an inner wall that encloses the refraction cavity of each light guide plate.

Optionally, the refractive indexes of the light guide plates are gradually reduced in the stacking direction of the light guide plates from a top surface of the light guide plate assembly to a bottom surface of the light guide plate assembly.

Optionally, the refraction cavity of each light guide plate is a micro-structured conical cavity.

Optionally, there is a plurality of refraction cavities juxtaposed in one side of each light guide plate.

Optionally, in one side of each light guide plate, the refraction cavities are juxtaposed in at least two rows.

Optionally, orthographic projections of the cavities of adjacent two light guide plates to the light guide plate assembly do not overlap each other.

Optionally, the light guide plate assembly further includes a reflective layer filled at a junction of adjacent two light guide plates.

Optionally, the light guide plate assembly includes a first light guide plate and a second light guide plate; the first light guide plate is made of a UV curing adhesive layer; and the second light guide plate is made of a Silica gel layer; and the second light guide plate is stacked on a bottom surface of the first light guide plate.

Optionally, the light guide plate assembly further includes a third light guide plate; the third light guide plate is stacked on a bottom surface of the second light guide plate; and the third light guide plate is made of PC plastic or polymethyl methacrylate.

Optionally, the light guide plate assembly further includes a microstructural prism layer at a top surface of the first light guide plate.

Optionally, sizes of prisms in the microstructural prism layer are gradually increased from a light incident side of the light guide plate assembly to a light emitting side of the light guide plate assembly.

Optionally, the microstructural prism layer is made of UV curing adhesive.

Optionally, the light guide plate assembly further includes a microstructural prism layer at a top surface of the light guide plate assembly.

Optionally, sizes of prisms in the microstructural prism layer are gradually increased from a light incident side of the light guide plate assembly to a light emitting side of the light guide plate assembly.

Optionally, the microstructural prism layer is made of UV curing adhesive.

According to a second aspect, one embodiment of the present disclosure provides a backlight source including the above light guide plate assembly and a light source disposed at a lateral side of the light guide plate assembly.

Optionally, the light source includes at least two light bars; each light bar includes a plurality of LED lights connected in series and matching the light guide plate assembly.

According to a third aspect, one embodiment of the present disclosure provides a display device including a backlight source and a display panel. The backlight source is behind the display panel; the backlight source is behind the display panel. The backlight source includes the above light guide plate assembly.

BRIEF DESCRIPTION OF THE DRAWINGS

A brief introduction will be given hereinafter to the accompanying drawings which will be used in the description of the embodiments in order to explain the embodiments of the present disclosure more clearly. The drawings in the description below are merely for illustrating some embodiments of the present disclosure. Those skilled in the art may obtain other drawings according to these drawings without any creative labor.

DETAILED DESCRIPTION

Figure 1:
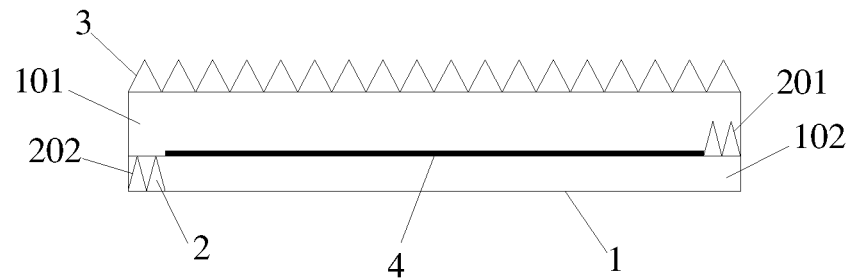
FIG. 1 is a sectional view of a light guide plate assembly according to an embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise indicated. The following description of exemplary embodiments is merely used to illustrate the present disclosure and is not to be construed as limiting the present disclosure.

One embodiment of the present disclosure provides a light guide plate assembly. The light guide plate assembly includes at least two layers of light guide plates 1 that are stacked on each other. Refractive indexes of the various light guide plates 1 in the light guide plate assembly are gradually reduced from a top surface of the light guide plate assembly to a bottom surface of the light guide plate assembly. The top surface of the light guide plate assembly refers to one surface adjacent to a display panel of a display device. One side of the light guide plate 1 is provided with a refraction cavity 2. The refraction cavities 2 of adjacent two layers of light guide plates 1 are disposed in a staggered manner. That is, the refraction cavity 2 of one of the adjacent two layers of light guide plates 1 is disposed at one side of the light guide plate assembly, and the refraction cavity 2 of the other one of the adjacent two layers of light guide plates 1 is disposed at an opposite side of the light guide plate assembly. A light scattering layer 6 is disposed at an inner wall that encloses the refraction cavity 2. In one embodiment, the refraction cavity 2 in the light guide plate 1 is manufactured by means of photoetching.

According to the light guide plate assembly provided in one embodiment of the present disclosure, when a light source is on and off, according to the law of light reflection and refraction, the light guide plate assembly can make a gentle transition to flicker occurring at some portion of a backlight source, and thus enables the display device to have the screen effect achieved by the TV backlight area adjustment technology, greatly improving an image contrast of the display device while reducing the power consumption of the display device.

As shown in FIG. 1, one embodiment of the present disclosure provides a light guide plate assembly. The light guide plate assembly includes a first light guide plate 101 and a second light guide plate 102 stacked on each other. Specifically, the second light guide plate 102 is stacked on a bottom surface of the first light guide plate 101. The first light guide plate 101 may be made of ultraviolet light (UV) curing adhesive and have a thickness in a range of 0.5 mm to 3 mm. The second light guide plate 102 may be made of Silica gel and have a thickness in a range of 0.4 mm to 3 mm. A refractive index of the first light guide plate 101 is greater than a refractive index of the second light guide plate 102. In some embodiments, the first light guide plate 101 may be a UV curing adhesive layer having a thickness of 1 mm; and the second light guide plate 102 may be a Silica gel layer having a thickness of 0.4 mm. In other embodiments, the first light guide plate 101 and the second light guide plate 102 may be made of other materials instead of the UV curing adhesive layer and the Silica gel layer, which will not be elaborated herein.

Figure 2:
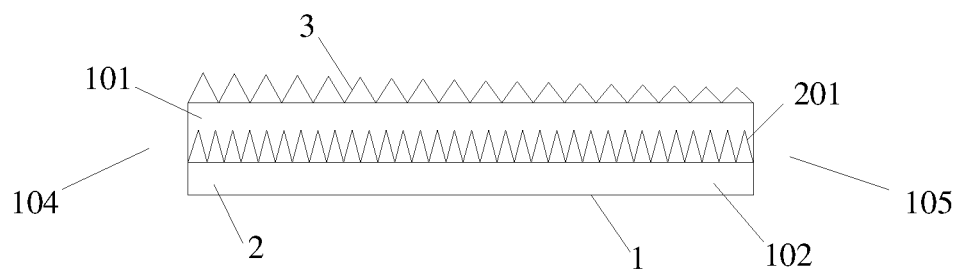
FIG. 2 is a side view of the light guide plate shown in FIG. 1.

As shown in FIG. 1 and FIG. 2, a first refraction cavity 201 is provided in an edge of one side (i.e., right side when the light guide plate assembly is at a position shown in FIG. 1) of the first light guide plate 101, and no refraction cavity is provided in an opposite side (i.e., left side when the light guide plate assembly is at a position shown in FIG. 1) of the first light guide plate 101. A second refraction cavity 202 is provided in one side (i.e., left side when the light guide plate assembly is at a position shown in FIG. 1) of the second light guide plate 102 away from the first refraction cavity 201. The first refraction cavity 201 and the second refraction cavity 202 are in two sides of the light guide plate assembly, respectively.

In one embodiment, there may be several first refraction cavities 201 juxtaposed in the first light guide plate 101, and there may be several second refraction cavities 202 juxtaposed in the second light guide plate 102. Specifically, the first refraction cavities 201 are arranged in an edge of one side of the first light guide plate 101 in rows along a propagation direction of light, and extend through the first light guide plate 101. The first refraction cavities 201 are continuously arranged with no gap between first refraction cavities 201. The second refraction cavities 202 are arranged in an edge of one side of the second light guide plate 102 in rows along the propagation direction of light, and extend through the second light guide plate 102. The second refraction cavities 202 are continuously arranged with no gap between second refraction cavities 202. There may be at two rows of first refraction cavities 201 in the one side of the first light guide plate 101. There may be at two rows of second refraction cavities 202 in the one side of the second light guide plate 102. A projection of the first refraction cavities 201 of the first light guide plate 101 to the light guide plate assembly in a vertical direction (when the light guide plate assembly is at the position shown in FIG. 1) does not overlap a projection of the second refraction cavities 202 of the second light guide plate 102 to the light guide plate assembly in the vertical direction.

The presence of at two rows of the first refraction cavities 201 and at two rows of second refraction cavities 202 enables light in the light guide plate assembly to have a small refraction angle, fluctuation of light energy to be small, make light uniform and make a gentle transition. In some embodiments, there are two rows of the first refraction cavities 201, and there are two rows of the second refraction cavities 202.

Figure 5:
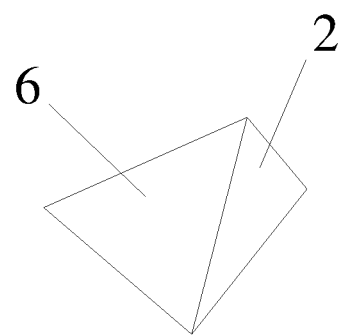
FIG. 5 is a schematic view of a refraction cavity in a light guide plate assembly according to an embodiment of the present disclosure.

As shown in FIG. 5, the refraction cavity 2 is a micro-structured conical cavity. In some embodiments, the refraction cavity 2 may be of a micro-structured triangular pyramid shape. The light scattering layer 6 is disposed at an inner wall that encloses the refraction cavity 2. The light scattering layer 6 may be a silicon dioxide layer, and the silicon dioxide layer may be formed on the inner wall that encloses the refraction cavity 2 by means of spray printing. In other embodiments, light scattering layer 6 may be made of other materials instead of silicon dioxide, such as resin or acrylic. The refraction cavity 2 may be one cavity of other shapes, such as conical or four pyramidal shapes, which are not elaborated herein.

As shown in FIG. 1, a reflective layer 4 is filled at a junction of the first light guide plate 101 and the second light guide plate 102. The reflective layer 4 may be a titanium barium white layer. The titanium barium white layer includes titanium dioxide with a mass percentage of 25% to 35%, and barium sulfate with a mass percentage of 75% to 635%. A thickness of the reflective layer 4 is in a range of from 0.05 mm to 0.2 mm. There is no overlapping portion between a projection of the reflective layer 4 to the light guide plate assembly in the vertical direction (when the light guide plate assembly is at the position shown in FIG. 1) and one of projections of the first refraction cavities 201 and at two rows of second refraction cavities 202 to the light guide plate assembly in the vertical direction. In some embodiments, the thickness of the reflective layer 4 may be about 0.1 mm. A transparent glue layer 41 is further filled at the junction of the first light guide plate 101 and the second light guide plate 102. The reflective layer 4 is attached between the first light guide plate 101 and the second light guide plate 102 by means of the transparent glue layer 41. The transparent glue layer 41 has a thickness in a range of 0.05 mm to 0.2 mm. In other embodiments, the reflective layer 4 may be made of other materials instead of titanium barium white layer, which will not be elaborated herein.

Figure 4:
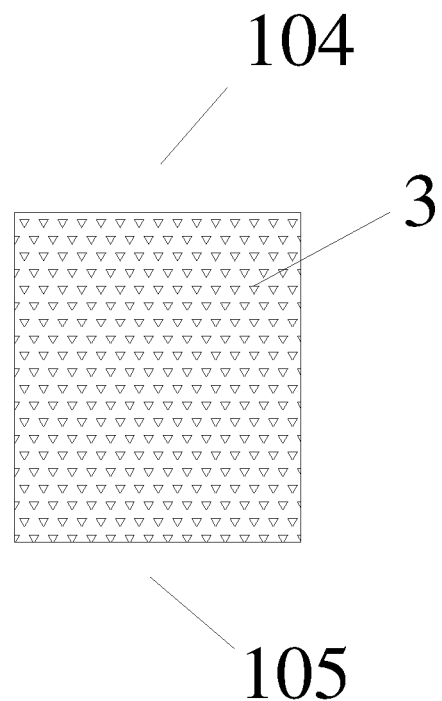
FIG. 4 is a schematic view of a top surface of a light guide plate assembly according to an embodiment of the present disclosure.

As shown in FIG. 2 and FIG. 4, the top surface of the light guide plate assembly is provided with a microstructural prism layer 3, that is, the microstructural prism layer 3 is formed on a top surface of the first light guide plate 101. The microstructural prism layer 3 includes a plurality of microstructural prisms. According to the law of light reflection and refraction, since the microstructural prisms at a light emitting side 104 of the light guide plate assembly has a light gathering ability higher than a light gathering ability of the microstructural prisms at a light incident side 105 of the light guide plate assembly, a size of each of the microstructural prisms is proportional to a distance from the each of the microstructural prisms to the light incident side 105, to ensure that light of the light guide plate assembly can be evenly distributed on the surface of the light guide plate assembly and to ensure luminance uniformity of the light guide plate assembly. Specifically, as shown in FIG. 2, sizes of the microstructural prisms are gradually increased from the light incident side 105 to the light emitting side 104.

In some embodiments, the microstructural prism layer 3 may be made of UV curing adhesive. One way of forming the microstructural prism layer 3 includes: first coating UV curing adhesive on the top surface of the light guide plate assembly; covering a mold with microstructural prism cavities on the UV curing adhesive with some of the UV curing adhesive filing in the microstructural prism cavities; then curing the UV curing adhesive filing in the microstructural prism cavities by means of UV irradiation, and then removing the UV curing adhesive outside of the microstructural prism cavities; and finally, removing the mold, thereby enabling the above microstructural prism layer 3 to be formed on the top surface of the light guide plate assembly.

Figure 3:
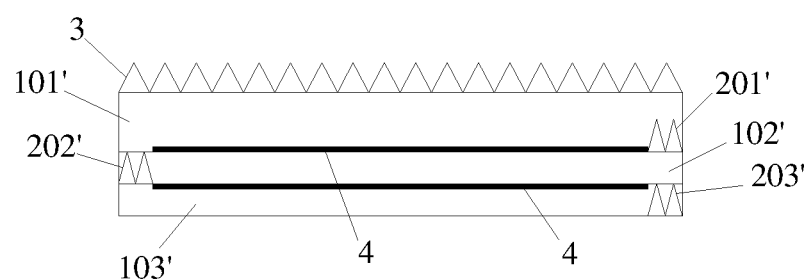
FIG. 3 is another sectional view of a light guide plate assembly according to an embodiment of the present disclosure.

One embodiment shown in FIG. 3 is different from the embodiment shown in FIG. 1 in that the light guide plate assembly includes a first light guide plate 101', a second light guide plate 102' and a third light guide plate 103' that are stacked on each other. Specifically, the second light guide plate 102' is stacked on a bottom surface of the first light guide plate 101', and the third light guide plate 103' is stacked on a bottom surface of the second light guide plate 102'. The first light guide plate 101' may be made of ultraviolet light (UV) curing adhesive; the second light guide plate 102' is made of Silica gel, and the third light guide plate 103' is made of PC plastic or polymethyl methacrylate, and thus refractive indexes of the first light guide plate 101', the second light guide plate 102' and the third light guide plate 103' are gradually reduced. There are two juxtaposed rows of first refraction cavities 201' provided in an edge of one side (i.e., right side when the light guide plate assembly is at a position shown in FIG. 3) of the first light guide plate 101'. There are two juxtaposed rows of second refraction cavities 202' provided in one side (i.e., left side when the light guide plate assembly is at a position shown in FIG. 3) of the second light guide plate 102' away from the first refraction cavities 201'. There are two juxtaposed rows of third refraction cavities 203' provided in one side (i.e., right side when the light guide plate assembly is at a position shown in FIG. 3) of the third light guide plate 103' away from the second refraction cavities 202'. A reflective layer 4 is filled at a junction of the first light guide plate 101' and the second light guide plate 102', and filled at a junction of the second light guide plate 102' and the third light guide plate 103'. In some embodiments, the first refraction cavities 201', the second refraction cavities 202' and the third refraction cavities 203' may be in form of the refraction cavity shown in FIG. 5.

Figure 6:
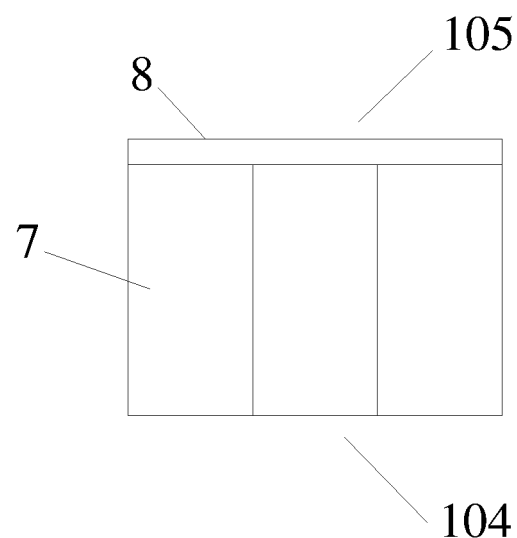
FIG. 6 is a schematic view showing assembling light guide plate assemblies according to an embodiment of the present disclosure.
Figure 7:
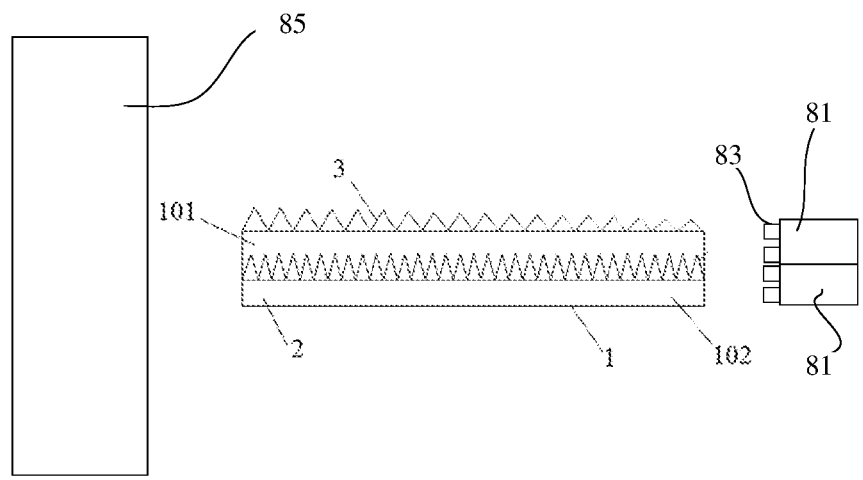
FIG. 7 is a schematic view of a display device according to an embodiment of the present disclosure.

As shown in FIG. 6, one embodiment of the present disclosure further provides a backlight source which includes a plurality of light guide plate assemblies 7. A light guide plate assembly 7 may be in form of the light guide plate assembly as shown in FIG. 1 or FIG. 2. The light guide plate assemblies 7 are spliced to form the backlight source. A light source 8 is disposed at a lateral side of the light guide plate assemblies 7. The light source 8 includes at least two light bars 81 (as shown in FIG. 7). Each light bar includes a plurality of LED lights 83 (as shown in FIG. 7) connected in series. A quantity of the LED lights in each light bar matches light distribution of the light guide plate assemblies 7. In this embodiment, the presence of two or more light bars each providing with LED lights matching the light distribution of the light guide plate assemblies 7, may reduce the quantity of LED lights that are connected in series due to the increased quantity of light bars, and may further reduce the size of the light guide plate assembly 7 so that more light guide plate assemblies 7 may be spliced, thereby enabling the display device to have a high contrast and a low power consumption.

In one embodiment of the present disclosure, when a screen of the display device is bright and dark, the intensity of the current of each series of LED lights in the backlight source is adjusted to achieve a matching bright and dark picture in the visible area of the backlight source, and finally the contrast of the display screen is enhanced.

One embodiment of the present disclosure further provides a display device that includes a backlight source and a display panel 85 (as shown in FIG. 7). The backlight source is behind the display panel. The backlight source includes a light guide plate assembly which may be in form the light guide plate assembly shown in FIG. 1 or FIG. 2.

The above are merely the optional embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:
1. A light guide plate assembly comprising:
at least two light guide plates that are stacked on each other;
wherein refractive indexes of the light guide plates are gradually reduced in a stacking direction of the light guide plates from a top surface of the light guide plate assembly to a bottom surface of the light guide plate assembly; and
wherein one side of each of the light guide plates is provided with a refraction cavity; and
wherein the refraction cavities of adjacent ones of the light guide plates are disposed in different sides of the light guide plate assembly in a staggered manner; and wherein a light scattering layer is disposed at an inner wall that encloses the refraction cavity of each of the light guide plates.

2. The light guide plate assembly of claim 1, wherein the refraction cavity of each of the light guide plates is a micro-structured conical cavity.

3. The light guide plate assembly of claim 1, wherein there is a plurality of refraction cavities juxtaposed in one side of each light guide plate.

4. The light guide plate assembly of claim 3, wherein in one side of each light guide plate, the plurality of refraction cavities are juxtaposed in at least two rows.

5. The light guide plate assembly of claim 3, wherein orthographic projections of the cavities of adjacent ones of the light guide plates to the light guide plate assembly do not overlap each other.

6. The light guide plate assembly of claim 1, further comprising a reflective layer filled at a junction of adjacent ones of the light guide plates.

7. The light guide plate assembly of claim 1, wherein the at least two light guide plates comprise a first light guide plate and a second light guide plate, and wherein the first light guide plate is made of a UV curing adhesive layer and the second light guide plate is made of a Silica gel layer, and wherein the second light guide plate is stacked on a bottom surface of the first light guide plate.

8. The light guide plate assembly of claim 7, wherein the at least two light guide plates comprise further comprise a third light guide plate, and wherein the third light guide plate is stacked on a bottom surface of the second light guide plate, and wherein the third light guide plate is made of PC plastic or polymethyl methacrylate.

9. The light guide plate assembly of claim 8, further comprising a microstructural prism layer at a top surface of the first light guide plate.

10. The light guide plate assembly of claim 9, wherein sizes of prisms in the microstructural prism layer are gradually increased from a light incident side of the light guide plate assembly to a light emitting side of the light guide plate assembly.

11. The light guide plate assembly of claim 9, wherein the microstructural prism layer is made of UV curing adhesive.

12. The light guide plate assembly of claim 1, further comprising a microstructural prism layer at a top surface of the light guide plate assembly.

13. The light guide plate assembly of claim 12, wherein sizes of prisms in the microstructural prism layer are gradually increased from a light incident side of the light guide plate assembly to a light emitting side of the light guide plate assembly.

14. The light guide plate assembly of claim 12, wherein the microstructural prism layer is made of UV curing adhesive.

15. A backlight source comprising the light guide plate assembly of claim 1 and a light source disposed at a lateral side of the light guide plate assembly.

16. The backlight source of claim 15, wherein the light source includes at least two light bars, and wherein each of the at least two light bars includes a plurality of LED lights connected in series and matching the light guide plate assembly.

17. A display device comprising: a backlight source and a display panel;
    wherein the backlight source is behind the display panel and the backlight source includes the light guide plate assembly of claim 1.

* * * * *